United States Patent [19]

Tench, Jr.

[11] Patent Number: 4,467,363
[45] Date of Patent: Aug. 21, 1984

[54] GRAPHIC DATA COMPRESSION
[75] Inventor: James G. Tench, Jr., Lexington, Ky.
[73] Assignee: International Business Machines Corporation, Purchase, N.Y.
[21] Appl. No.: 423,572
[22] Filed: Sep. 27, 1982
[51] Int. Cl.³ .............................................. H04N 1/32
[52] U.S. Cl. .................... 358/261; 358/256; 358/257; 358/263; 358/296; 364/523
[58] Field of Search ............... 358/256, 257, 260, 261, 358/263, 296; 364/523

[56] References Cited

U.S. PATENT DOCUMENTS

| | | | |
|---|---|---|---|
| 2,978,535 | 4/1961 | Brown | 358/261 |
| 3,483,317 | 12/1969 | De Groat | 358/261 |
| 3,739,085 | 6/1973 | Rosen et al. | 358/261 |
| 3,748,379 | 7/1973 | Epstein et al. | 358/261 |
| 3,830,963 | 8/1974 | Garcia | 358/261 |
| 4,117,517 | 9/1978 | Shintani et al. | 358/261 |
| 4,121,259 | 10/1978 | Preuss et al. | 358/261 |
| 4,136,363 | 1/1979 | Saran | 358/261 |
| 4,409,621 | 10/1983 | Richards | 358/261 |
| 4,409,623 | 10/1983 | Kobayashi | 358/261 |
| 4,410,916 | 10/1983 | Pratt | 358/261 |

OTHER PUBLICATIONS

IBM Technical Disclosure Bulletin, vol. 20, No. 7, Dec. 1977, pp. 2555-2557 by W. B. Greene et al. entitled "Image Data Compression Algorithm."

IBM Technical Disclosure Bulletin, vol. 23, No. 12, May 1981, pp. 5471-5472 by D. G. Fitch et al. entitled "Font Data Reduction by Scan Compression for Ink Jet Printers."

Primary Examiner—Howard W. Britton
Attorney, Agent, or Firm—John A. Brady

[57] ABSTRACT

Code compression for a dot printer 1 having a printhead 3 with a vertical line of print elements 5. The coding reduces requirements for space in font memory 13 and is readily translated and acted upon. In each eight-bit byte, microprocessor 11 interprets three bits as coding mode commands and the other five bits as content information, primarily as numbers. Printer control code modes are: black in sequence, black in sequence, complete white, white in sequence, repeat column, map bytes (bit-for-bit), and offset. The content information number is stored in register 21 (19 for offset) and printing in the form defined by the code mode is executed the number of times as stored in the register 21 (19 for offset).

20 Claims, 2 Drawing Figures

GRAPHIC DATA COMPRESSION

DESCRIPTION OF THE INVENTION

1. Technical Field

This invention relates to the storage of graphic information by binary units in a form which reduces overall storage. The stored information is interpreted for use to drive lines of individual picture elements (PELs). This invention is particularly suited to matrix printing by which a vertical line of print point elements (forty in the preferred embodiment) is controlled from an electronic memory carrying coded information which is automatically translated during use to a specific one of two graphic signals to each of the print elements. Additionally, this invention, particularly its specific aspects, is well suited to printing text in different type styles and different languages.

2. Background Art

Known data-compression systems employ one or a few coding modes which reduce data storage requirements somewhat but nevertheless require more data than is required in accordance with this invention. Moreover, this invention employs some coding modes which are not used in any known combination with other coding modes.

A standard coding mode for such data compression is run-length coding. U.S. Pat. No. 4,121,259 to Preuss et al is illustrative. Certain of the codes in this patent have a prefix followed by number information. Run-length coding is characterized by the use of preselected codes to specify continuous strings of black or white elements at the output. With each change between dark and light, a new code is required which uniquely defines the length of the next continuous string. Where the particular graphic stored changes from light to dark frequently, basic run-length coding is not greatly effective in reducing code storage requirements.

U.S. Pat. No. 4,117,517 to Shintani et al and the article entitled "Image Data Compression Algorithm," by W. B. Green et al in IBM Technical Disclosure Bulletin, Vol. 20, No. 7 (December 1977) at pp. 2555–2557 each teach the use of coding with a prefix to be interpreted followed by a special code for the pattern. In the article, image elements corresponding to a 9 bit matrix are printed followed by the printing of the number of zero elements corresponding to the number represented by the contents of 2 bit positions. The control prefix simply specifies whether the remaining data is to be used at all. Where the image following the matrix part has two or less zeros, no code compression is realized.

The Shintani patent is illustrative of another standard data-compression mode, the comparing of contiguous columns of the image and specifying the subsequent columns with codes only representative of the differences. The prefix code in this patent is interpreted as calling for the following codes to be displayed bit-for-bit or, alternatively, a run-length coding, rather than in a form to be expanded. The invention here described and claimed has one of a plurality of modes, one of which is a bit-for-bit display and others which are length coding. The Shintani patent does not provide for a similar plurality of modes. In Shintani, when the column changes to an extent that the compressed coding is not useful, the single alternative is bit-for-bit, which does not compress the data at all or a run-length encoding, if that is the alternative coding provided for by the system.

The article entitled "Font Data Reduction by Scan Compression for Ink Jet Printers," by D. G. Fitch et al in IBM Technical Disclosure Bulletin, Vol. 23, No. 12 (May 1981) at pp. 5471–5472 teaches the use of a prefix code to define predetermined large areas which are to be white. When one of those areas has a single black, the prefix code achieves no data compression for that area.

DISCLOSURE OF THE INVENTION

This invention employs a prefix or command code to define at least three different coding concepts or modes. The coding modes or statuses include (1) continuous-string (defined color in sequence); (2) column-repeat; (3) and bit-for-bit specification. Accordingly, when long strings of white or black are in the image, the advantages of specifying string lengths are realized by using the continuous-string mode of coding. The mode is defined by the command code. When adjoining columns are identical, the command code specifies a column repeat. Where neither of those is effective, the command code may call for bit-by-bit imaging.

In addition to the command code, each image code contains a content code. In a coding mode specifying repetitive display, the content code is a number specifying the times of repetition. In the bit-for-bit mode, the content code defines the number of subsequent image codes the bit pattern of which are is to be replicated as PELs in the graphic image.

This use of plural coding modes provides the opportunity to store various repetitive aspects of the image in a highly compressed codes. The reservation of three bit positions for command code permits up to eight different modes which, in the preferred embodiment, are selected to be different modes of special utility for the printing of text in different typestyles and for different language.

One such mode, the offset mode, specifies that all data below a certain level is white, a condition often occurring in text. Another mode specifies that everything after a vertical string of black is white, also a condition often occurring in text.

BRIEF DESCRIPTION OF DRAWING

The details of this invention will be described by reference to the accompanying drawing in which.

BEST MODE FOR CARRYING OUT THE INVENTION

Figure 1:
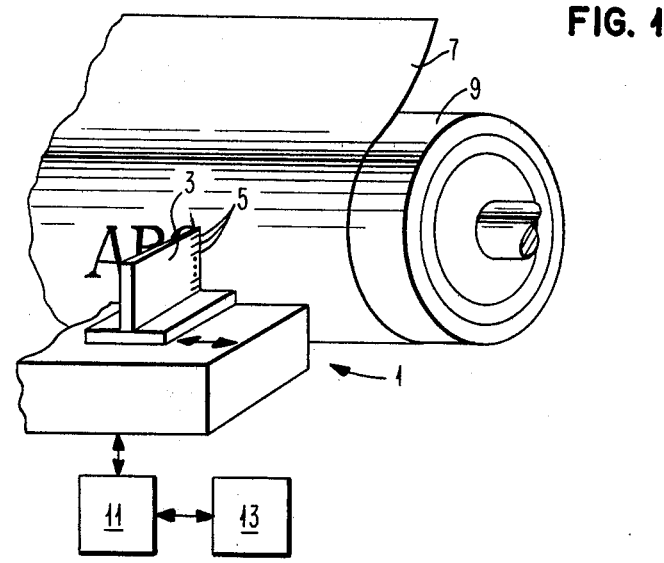
FIG. 1 is illustrative of the significant elements of the printer system in accordance with this invention.

This invention provides a coding algorithm for a matrix printer having a single vertical line of forty print elements and electronic logic. The coding reduces memory requirements and thereby permits a wide selection of characters and symbols to be stored in a physically small font memory. The coding is readily transmitted, interpreted by the electronic logic, and acted upon by the printer.

The data is processed in bytes of eight bits. The first three bits are interpreted as function or mode commands and the next five bits, the content code, is interpreted in accordance with the specific function or mode specified.

The three command bits may take on eight permutations, which correspond to standard natural binary number interpretation of 0 through 7. Six of these permutations are employed as direct printing commands, and two are employed to modify the function of the control electronics, which in this preferred embodiment is an electronic data processor, specifically a microprocessor.

The following designates the different command permutations by the number value, assigns a summary title (for example, "CONTROL" for 0), and states in detail the mode or function carried out by the electronic system in response to the command.

0—CONTROL—This is not a printer-control command. The content code (the remaining five bits of the eight bit byte) specify a change in operation of the control electronics. Specifically, in the preferred embodiment in which control is by a microprocessor, the content code is entered as an address used by the operation control of the microprocessor, thus effecting a standard branch to a different routine.

1—WHITE COUNT—The next print elements equal in number to the number represented by the content code are printed white.

2—REPEAT COLUMN—The preceding column is printed identically a number of times equal to the number represented by the content code.

3—ESCAPE—The printer is not directly controlled. The content code is entered into the microprocessor as a constant number which defines the width of characters to be printed by defining the number of columns to be printed.

4—BLACK COUNT—The next print elements equal in number to the number represented by the content code are printed black.

5—BLACK COUNT COMPLETE WHITE—The same as BLACK COUNT with all remaining elements to the top of the forty-element column being printed white. Where the control code represents zero, all elements are printed white.

6—BASE OFFSET—Consecutive elements from the bottom equal in number to the number represented by the content code are printed white. This is acted upon until changed by a different BASE OFFSET command. This command must be issued prior to commands defining the middle of the column.

7—MAP BYTES (BIT-FOR-BIT)—The next bytes from memory equal to the number represented by the content code are printed in a pattern which is a bit-for-bit representation of the bytes. Any remaining bits in a column are completed in white. The bit-for-bit printing is started at a level defined by a prior BASE OFFSET command.

The drawing shows a printer 1, indicated entirely symbolically, having printhead 3 having forty small print elements 5 in a straight vertical line. Element 5 print dots or PELs so small that adjoining ones blend together in normal observation to appear as continuous marks. The type of printer 1 and printhead 3 form no part of this invention. Printing may be, for example, thermal, electrothermal, or by impact, in which case the elements 5 typically are moveable wires. As is conventional, paper 7 is mounted on a platen 9, and printhead 3 is moved laterally relative to paper 7. All of the print elements 5 to be driven for printing are driven simultaneously. The lateral movement is preferably continuous and the simultaneous driving is at regular intervals, thereby defining an effective predetermined width between printed columns. This effective width may be varied to achieve various printing effects, such a compressed to conserve paper in a draft mode. Such variation forms no part of this invention.

Although special-purpose electronic logic is faster than a general purpose digital electronic microprocessor, the microprocessor is less expensive and more versatile. Accordingly, the preferred embodiment is implemented with a suitably programmed microprocessor 11. Function or routine selection based on code recognition, repetitive action based on a count, and internal branching of control are basic, well-developed capabilities of any standard electronic data processor. Details of implementation are inherent in the microprocessor 11 used and form no part of this invention.

Memory 13 is a high speed, electronic data-processing memory which stores information in binary form which may be, for example, off or on; or changed or not changed. All processing is in binary form and each print element 5 prints either a black (or dark or colored) PEL or a white PEL. Typically, an element 5 is physically powered or driven to create black, and a white is achieved by not driving an element 5 and leaving the corresponding area of paper 7 white.

Figure 2:
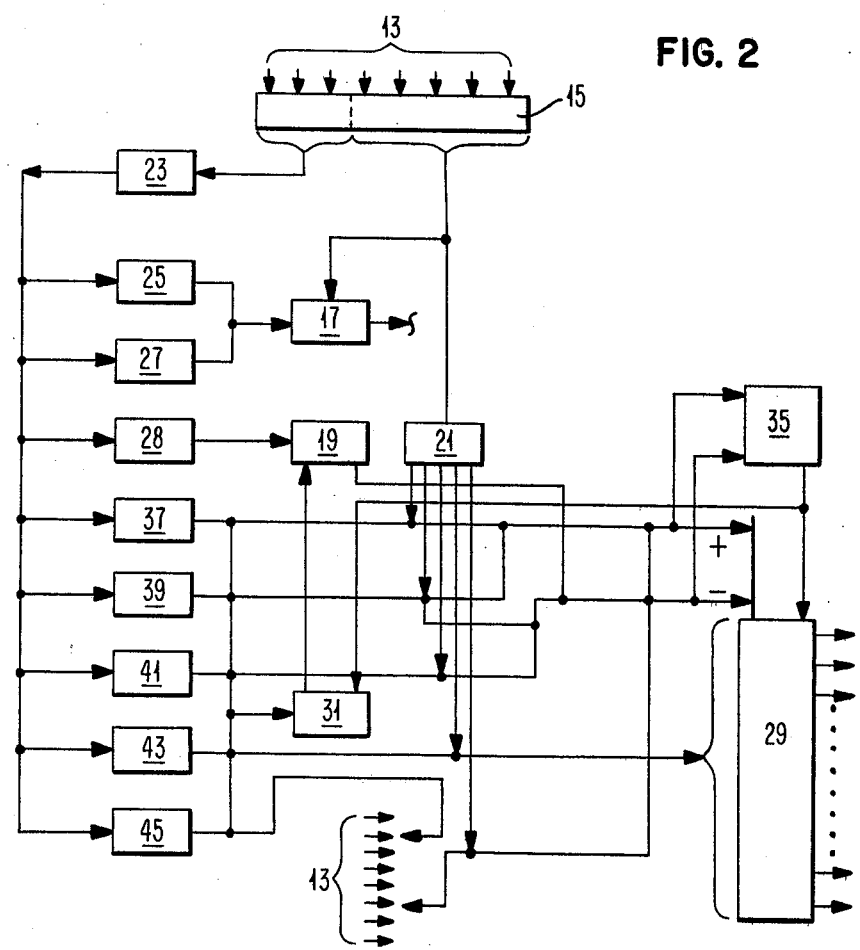
FIG. 2 is illustrative of the processing of code bytes to interpret them and drive the print elements.

Internal processing of data, so far as is essentially significant to this invention, is illustrated in FIG. 2. Each eight bit byte of data from memory 13 is presented to the decoder 15, which decodes the 3 bit control code to select one of eight possible function or mode commands. For CONTROL and ESCAPE commands, the five digit content code is entered in Control Register 17. For the BASE OFFSET command, the content code is entered into Count Register 19. For the other five commands, the content code is entered in Count Register 19.

The Begin Execute 23 action is then conducted. The selected one of the eight functions is executed as follows:

The function Execute CONTROL 25 is executed by the contents of Control Register 17 defining the start of a data processing sequence by microprocessor 11. This sequence may be, for example, one to effectuate line feed of paper 7. No graphic code for printhead 3 is prepared.

The function Execute ESCAPE 27 is executed by entering the contents of register 17 as a reference value in microprocessor 11 to define character width. No graphic code for printhead 3 is prepared.

The function BASE OFFSET 28 is executed by the changing of the contents of register 19 to the new number in the content code containing the base offset command.

The next five functions result in part or all of forty binary signals, one for each print element 5, being generated. The forty signals are sent to the print elements 5 from Print Buffer Register 29. As each function is executed, a Start Column Flag Register 31 is first interrogated. Where set to one, Count Register 19 is accessed and that number of binary zero signals, specifying white, is entered into buffer register 29. (The entry for white is shown illustratively as a minus line.) Flag register 31 is then set to zero.

Column Counter 35 is at zero at the start of each new generation of graphic code for a column. Counter 35 is incremented once for each bit entered into register 29. When counter 35 reaches forty, a graphic signal ready signal is generated and flag register 31 is set to 1. Microprocessor 11 responds to the ready signal by driving the printhead 3 with the parallel signal at the next appropriate interval.

In addition to the column beginning and column ending activities, the remaining five functions are executed as follows:

The function Execute BLACK COUNT 37 is executed by accessing the number in Count Register 21. That number of binary one signals, specifying black, is entered into buffer register 29 in sequence immediately following any data already entered in register 29. (The entry for black or dark is shown illustratively as a plus line.)

The function Execute BLACK COUNT COMPLETE WHITE 39 is executed by accessing the number in Count Register 21. That number of binary one signals, specifying black, is entered into buffer register 29 in sequence immediately following any data already entered in register 29. The binary zero signals, specifying white, are similarly entered until column counter 35 reaches zero.

The function Execute WHITE COUNT 41 is executed by accessing the number in Count Register 21 That number of binary zero signals, specifying black, is entered into buffer register 29 in sequence immediately following any data already entered in register 29.

The function Execute REPEAT COLUMN 43 is executed by accessing the number in Count Register 21. The contents of register 29, the graphic information for the last column, are transmitted to drive printhead 3 as additional full column drive signals, printing separate normally spaced columns the same number of times as the number in register 19.

The function Execute MAP BYTES 45 is executed by accessing the number in Count Register 21. The contents of the same number of bytes as the number in register 19 are entered into buffer register 29 in sequence. The significance of each bit of the memory bytes is unchanged and location of each bit in the overall sequence is unchanged, so that the graphic data in register 29 is bit-for-bit to that from memory 13.

As each graphic column is filled in register 29, register 31 is set to one and counter 35 is set to zero as described.

The foregoing is further illustrated by the following selected examples.

EXAMPLE 1

Assuming the start of a column and the next byte from memory 13 is 10001101. The command code bits are 100 which is binary 4. The command is therefore BLACK COUNT. The content code bits are 01101, which is binary 13. Assuming no BASE OFFSET, 13 one bits are entered as the lowest 13 bits in register 29.

The next byte from memory 13 is 11100100. The command code bits are 111, which is binary 7. The command is therefore MAP BYTES. The content code bits are 00100, which is binary 4. The next byte from memory 13 is 00101101. This is entered in sequence in buffer 29. The next byte from memory 13 is 11100011, and this is entered in sequence in buffer 29. The next byte from memory 13.is 10110010, and this is entered in sequence in buffer 29. The next byte from memory 13 is 10100000. The first three bits are entered in sequence in buffer 29, entry being terminated because the full 40 bit of a column are entered. The final contents of buffer 29 are 0001011001011000110010110111111111111111. This is printed as a vertical column with each print element 5 of printhead 3 driven in accordance with the one of the graphic bit to which it corresponds in sequence. The first generated bits correspond to the lower ones of print elements 5.

The next byte from memory 13 is 01010001. The command code bits are 010, which binary 2. The command is therefore REPEAT COLUMN. The content code bits are 10001, which is binary 17. The contents of register 29 are acted upon 17 times to drive the printer to print 17 normally spaced columns identical to the contents of register 29.

EXAMPLE 2

Assume the start of a column and the next byte from memory 13 is 11010110. The command code bits are 110, which is binary 6. The command is therefore BASE OFFSET. The content code bits are 10110, which is binary 22. The number 22 is entered into Count Register 19.

The next byte from memory 13 is 10101111. The command code bits are 101, which is binary 5. The command is therefore BLACK COUNT COMPLETE WHITE. The content code bits are 01111, which is binary 15. As Column Flag Register 31 is set to one, twenty-two zero bits are entered into buffer register 29, and register 31 is set to zero. Then 15 one bits are automatically entered into register 29. Finally, zeros in the remaining bits in the column, three in this instance, are automatically entered in register 29, and flag register 31 is set to one. The final contents of buffer 29 are 0001111111111111110000000000000000000000. This is printed.

The next byte from memory 13 is 101001110. The command code bits are 101, which is binary 5. The command is therefore BLACK COUNT COMPLETE WHITE. The content code bits are 01110, which is binary 14. Column Flag Register 31 is set to one. Twenty-two zeros, as specified by Count Register 19, are entered into buffer register 29, and the register 31 is set to zero. Then 14 one bits are automatically entered into register 29. Finally, zeros in the remaining bits in the column, four in this instance, are automatically entered in register 29, and flag register 31 is set to one. The final contents of buffer 29 are 0000111111111111110000000000000000000000. This is printed.

The next byte might be a REPEAT COLUMN command code with a five content code. In that event, the foregoing contents of buffer 29 which drive the printhead 3 for the next five columns.

The next byte might be 01100000. This is a BASE OFFSET command with a content code of zero. The content of Count Register 19 is set to zero. Subsequent operation will refer to register 21 and insert no starting zeros. The next byte from memory 13 might be 00110101. The command code bits are 001, which is binary 1. The command is therefore WHITE COUNT. The content code bits are 10101, which is binary 25. Twenty-one zero bits are entered as the lowest 25 bits in register 29. The next byte from memory 13 might be a BLACK COUNT COMPLETE WHITE with a content code of 14. Fourteen one bits are entered into register 29, automatically followed by the remaining zero bit to fill the column. The final contents at buffer 29 are 0111111111111110000000000000000000000000.

It will be clear that this invention may be implemented with both special purpose electronics and general purpose digital data processing equipment, and that the form of implementation may readily be changed while still practicing the essential concepts and spirit of this invention. It will also be clear that some of the coding modes may not be used at limited sacrifice of advantage, while the use of a combination of several modes still provides the basic advantages of this invention. Patent coverage therefore should not be limited by the details disclosed but should be commensurate with the spirit and scope of the underlying invention disclosed, particularly reference being made with respect to the following claims.

I claim:

1. A printing system to print visual representations of symbols communicated to said system in code bytes, said system comprising:
   a printer,
   means to observe one of said bytes to produce from said byte a command status defining one of at least three kinds of coding modes, a different command status being produced for each of said coding modes,
   means to observe said one byte to produce from said one byte a content status defining number information, and
   means responsive to said command status and said content status to cause said printer to print visual functions of the kind defined by said command status a number of times defined by said content status.

2. The printing system as in claim 1 in which said coding modes include: defined color in sequence, repeat column, and bit-for-bit.

3. The printing system as in claim 2 in which said coding modes include dark in sequence followed by remaining column in white.

4. The printing system as in claim 1 in which said command status defines one of at least four kinds of coding modes, one of said coding means being an offset mode, and also comprising
   first means to store the content status from code bytes for said offset mode,
   second means defining the start of graphic information for a column, and
   means responsive to said second means to cause said printer to print predetermined visual information at the start of a column a number of times defined by said first means.

5. The printing system as in claim 2 in which said command status defines one of at least four kinds of coding modes, one of said coding modes being an offset mode, and also comprising
   first means to store the content status from code bytes for said offset mode,
   second means defining the start of graphic information for a column, and
   means responsive to said second means to cause said printer to print predetermined visual information at the start of a column a number of times defined by said first means.

6. The printing system as in claim 3 in which said command status defines one of at least four kinds of coding modes, one of said coding modes being an offset mode, and also comprising
   first means to store the content status from code bytes for said offset mode,
   second means defining the start of graphic information for a column, and
   means responsive to said second means to cause said printer to print predetermined visual information at the start of a column a number of times defined by said first means.

7. A system for printing comprising
   a printhead having a line of individual print elements each adapted to effect when driven printing of an area corresponding to the area of the element,
   a high speed, data-processing memory to store binary data in bytes of a predetermined number of bits,
   means to observe one of said bytes to produce a command status from at least two predetermined ones of said bits and to produce a content status defining number information from at least two others of said bits, and
   means responsive to said command status and said content status to drive said print elements in a configuration defined by said command status a number of times defined by said content status.

8. The status for printing as in claim 1 in which said different command statuses defined by said at least two bits include: defined color in sequence, repeat column, and bit-for-bit.

9. The system for printing as in claim 8 in which said coding modes include dark in sequence followed by remaining column in white.

10. The system for printing as in claim 7 in which one command status defined by said at least two bits is an offset mode, and also comprising
    first means to store the content status from bytes having said offset mode command status,
    second means defining the start of graphic information for a column, and
    means responsive to said second means to drive said print elements for printing predetermined visual information at the start of a column a number of times defined by said first means.

11. The system for printing as in claim 8 in which one command status defined byy said at least two bits is an offset mode, and also comprising
    first means to store the content status from bytes having said offset mode command status,
    second means defining the start of graphic information for a column, and
    means responsive to said second means to drive said print elements for printing predetermined visual information at the start of a column a number of times defined by said first means.

12. The system for printing as in claim 9 in which one command status defined by said at least two bits is an offset mode, and also comprising
    first means to store the content status from bytes having said offset mode command status,
    second means defining the start of graphic information for a column, and
    means responsive to said second means to drive said print elements for printing predetermined visual information at the start of a column a number of times defined by said first means.

13. The system for printing as in claim 9 in which said bits to produce a command status comprise three bits and said bits to produce a content status comprise five bits.

14. The system for printing as in claim 12 in which said bits to produce a command status comprise three bits and said bits to produce a content status comprise five bits.

15. The system as in claim 13 in which said different command statuses defined by said three bits comprise:

dark in sequence, dark in sequence and complete column in white, and white in sequence.

16. The system as in claim 14 in which said different command statuses defined by said three bits comprise: dark in sequence, dark in sequence and complete column in white, and white in sequence.

17. A printing system to print visual representations of symbols communicated to said system in code bytes having at least six bits, said system comprising
   a printer,
   means to observe one of said bytes to produce from at least two predetermined ones of said bits a command status defining one of at least four kinds of coding modes, said coding modes including defined color in sequence, defined color in sequence followed by different color to end of line, repeat column, and bit-for-bit,
   means to observe at least three other bits of said byte to produce a content status defining number information, and
   means responsive to said command status and said content status to cause said printer to print visual functions of the kind defined by said command status a number of times defined by said content status.

18. The printing system as in claim 17 in which said coding modes includes an offset mode, and also comprising
   first means to store the content status from bytes having said offset mode command status,
   second means defining the start of graphic information for a column, and
   means responsive to said second means to cause said printer to print predetermined visual information at the start of a column a number of times defined by said first means.

19. A printing system to print visual representations of symbols communicated in a code having command-status information and associated number information comprising:
   a printer,
   means to observe information communicated in said code to produce a command status defining at least three kinds of coding modes, said coding modes including offset and defined color in sequence followed by different color to end of line,
   means to observe information communicated in said code to produce a number status defining said number information, and
   means responsive to said command status and said number status to cause said printer to print visual functions of the kind defined by said command status a number of times defined by said number status.

20. A printing system as in claim 19 comprising for said offset mode
   first means to store said number status for said offset mode from said communicated information,
   second means defining the start of graphic information for a line, and
   means responsive to said second means to cause said printer to print predetermined visual information at the start of a column a number of times defined by said first means.

* * * * *